May 14, 1968   R. W. JOHNSON   3,383,302
ELECTRICAL STOCK REMOVAL ELECTRODE
Filed Dec. 20, 1965

INVENTOR.
Roger W. Johnson
BY
Hugh L. Fisher
ATTORNEY

3,383,302
ELECTRICAL STOCK REMOVAL ELECTRODE
Roger W. Johnson, Rochester, Mich., assignor to General Motors Corporation, Detroit, Mich., a corporation of Delaware
Filed Dec. 20, 1965, Ser. No. 515,009
10 Claims. (Cl. 204—224)

ABSTRACT OF THE DISCLOSURE

An electrical stock removal tool incorporating a conductive, flexible member that is positioned in the machining fluid flow passage so as to be vibrated by the fluid flow and cause electrical stock removal to occur within the proximity of the machining fluid exit from the tool.

---

This invention relates to improvements in electrodes for use, although not exclusively, with electrical stock removal apparatus.

In the electrical stock removal process, for example, that known as electrochemical machining, an electrolyte is utilized that is often required to be transferred through a passage in the cutting tool electrode. Consequently, when a blind or non-through opening is being machined in a workpiece, a ridge will be formed in the proximity of this passage exit from the tool. This ridge, of course, is objectionable if a smooth surface is wanted and also it is potential stress concentrator.

With the foregoing in mind an electrode of the mentioned through passage type is proposed for eliminating in a new and different way this ridge as the workpiece is machined.

More specifically proposed is an electrode of the aforegoing kind employing a conductive flexible member that is caused by the machining fluid as it flows through the passage to vibrate and in turn cause stock removal to occur within the proximity of the passage exit, thereby eliminating the objectionable ridge that would otherwise form.

Figure 1:
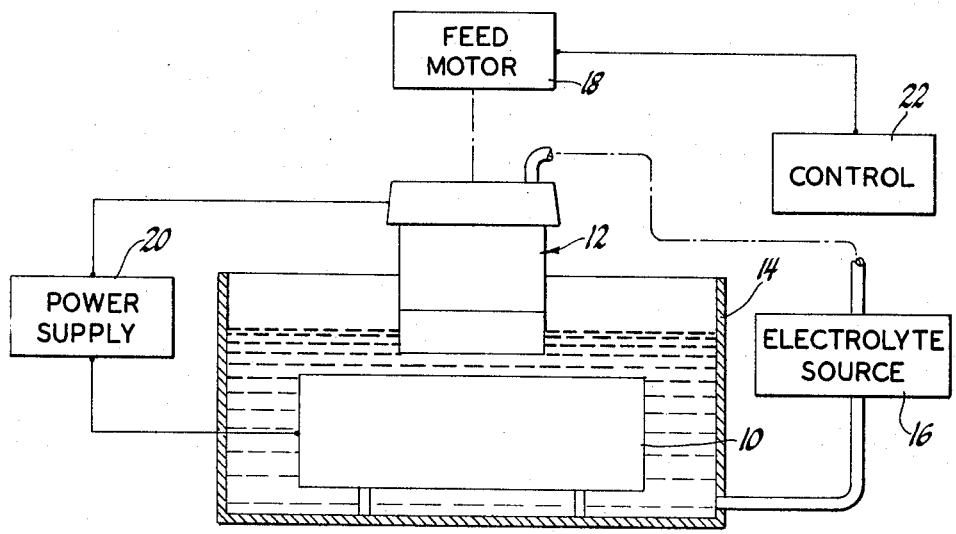
Figure 2:
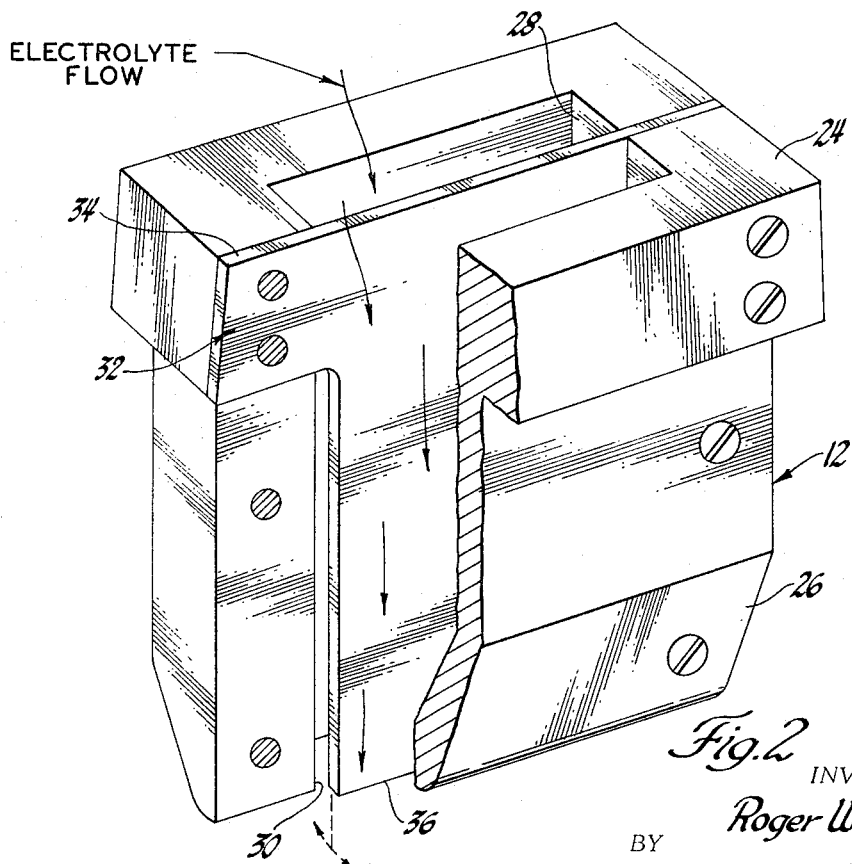

The foregoing and other objects and advantages of the invention will become apparent from the following description and from the accompanying drawings, in which:

FIGURE 1 is a schematic diagram of apparatus incorporating the principles of the invention; and FIGURE 2 is a perspective view with a fragmentary section of an electrode formed according to the invention.

Referring first to FIGURE 1, electrical stock removal apparatus, such as that employed in the electrochemical machining process, is illustrated for machining a conductive workpiece 10 with a conductive cutting tool 12. The workpiece 10 is situated within a tank 14 to which is supplied an appropriate electrolyte from a source 16 through an interior passage in the cutting tool 12. An appropriate feed motor 18 maneuvers the cutting tool 12 relative to the workpiece 10 while a direct current is provided from a suitable power supply 20 connected across the workpiece 10 and the cutting tool 12, each of which serves as an electrode. The function of the feed motor 18 is to maintain a certain gap spacing between the workpiece 10 and the cutting tool 12. This being accomplished by a suitable control 22 so that in a well known way stock is electrochemically machined from the workpiece 10 to form an opening therein having the general shape of the cutting tool 12. Other variations of the depicted apparatus will occur to those versed in the art; e.g., the workpiece 10 could be moved by the feed motor 18 if preferred.

Referring now to FIGURE 2, the structural details of the electrode referred to in FIGURE 1 as the cutting tool 12 has a holder end 24, which is constructed so as to be attachable to the feed motor 18, and a cutting end 26 having a configuration determined by the desired shape of the opening to be formed in the workpiece 10. A through passage 28 is provided in the electrode and exits therefrom at 30. As can be observed the passage 28 is rectangular-shaped and represents a considerable area at the exit 30. Because of the nature of the electro-chemical machining process, current flow occurs between the cutting end 26 and the adjacent surface on the workpiece 10 through the electrolyte. However, there is little if any current flow in the area defined by this rectangularly-shaped exit 30. Consequently, at the exit 30 an objectionable ridge will form having the same general shape as the exit 30. This ridge, of course, is objectionable if a smooth surface is wanted. Then too, this ridge can serve as a source of undesirable stress concentrations.

To overcome this problem, provision is made for vibrating a part of the cutting tool 12 back and forth across the exit 30 so that current flow occurs between the workpiece 10 and this part of the cutting tool 12. This is accomplished by forming the cutting tool 12 into two identical parts that together define the opening 28. These two parts have interposing therebetween and joined thereto, as by rivets or the like, a flexible member or reed 32. This flexible reed 32 extends, as viewed in FIGURE 2, downwardly from its fixed end 34 and terminates in a free end 36. Consequently, when the electrolyte flows through the passageway 28, the flexible reed 32 will at its free end 36 commence to vibrate at a frequency determined by the velocity and the pressure of the electrolyte. As the end 36 moves back and forth across the exit 30, a conductive path is continuously provided for the electric current between the workpiece 10 and the area defined by the exit 30. Hence, the desired machining occurs and no ridge can form.

The flexible reed 32 is preferably formed of a material that will cause it to be at substantially the same potential as the body of the cutting tool 12. Also, because the flexible reed 32 must be of a relatively thin shape to attain the vibration requirements, the material of the flexible reed 32 should also preferably have a higher threshold voltage than the material of the electrode body. This eliminates the tendency for secondary erosion of the flexible reed 32 to occur, particularly along its edges and at the free end 36. This secondary erosion would tend to erode the flexible reed 32 prematurely. Moreover, the material of the flexible reed 32 must be relatively inert to the corrosive effects of the electrolyte while still a good electrical conductor. Suggested materials are those in a group consisting of tantalum, titanium, columbium, hafnium and zirconium.

From the foregoing it will be appreciated that the problem of ridges when machining non-through openings in workpieces is eliminated by operation of the flexible reed 32, which causes this previously difficult to machine area at the electrolyte exit 30 to be removed as the workpiece 10 is machined. This is done with a relatively inexpensive construction and one that has durability as well as simplicity.

The invention is to be limited only by the following claims.

What is claimed is:

1. In apparatus for use in the electrical removal of stock from a conductive workpiece, the apparatus comprising workpiece holder means, an electrical stock removal tool for machining the workpiece, means for causing relative movement between the tool and the workpiece and for maintaining a predetermined gap spacing therebetween, means supplying a machining fluid to the gap, and a power source connected across the gap, the improvement wherein the body having a holder end and a cutting end, the cutting end being formed with a shape corresponding to that of the opening to be made in the workpiece, the body having a fluid conducting passageway extending therethrough and to a fluid exit in the cutting end, conductive means adapted to vibrate across the cutting end in the proximity of the exit from the body so as to cause stock removal to occur in the proximity of the exit and thereby eliminate the formation of a high spot on the workpiece in the vicinity of the exit.

2. The apparatus described in claim 1 wherein the vibrating means is a flexible member movably supported by the body.

3. An apparatus as described in claim 1 wherein the vibrating means is a flexible reed formed of a material that is substantially inert to the fluid and is electrically conductive.

4. An apparatus as described in claim 1 wherein the body is formed in two symmetrical parts that together define the fluid conducting passageway therethrough and wherein the vibrating means is a flexible reed interposed between the two parts so as to intersect the passageway, the flexible reed being fixedly joined to the two parts at the holder end of the body and extending therefrom to the exit at the cutting end of the body so as to be vibrated by the fluid flowing through the passageway and thereby cause stock to be removed from the workpiece in the vicinity of the exit.

5. The apparatus described in claim 2 wherein the flexible member is formed of a metal selected from the group consisting of tantalum, columbium, titanium, hafnium and zirconium.

6. The apparatus described in claim 2 wherein the flexible member is formed of tantalum.

7. The apparatus described in claim 2 wherein the flexible member is formed of columbium.

8. The apparatus described in claim 2 wherein the flexible member is formed of titanium.

9. The apparatus described in claim 2 wherein the flexible member is formed of zirconium.

10. The apparatus described in claim 2 wherein the flexible member is formed of hafnium.

References Cited

FOREIGN PATENTS 11,260   5/1963   Japan.

HOWARD S. WILLIAMS, *Primary Examiner.*

D. R. JORDAN, *Asistant Examiner.*

UNITED STATES PATENT OFFICE
CERTIFICATE OF CORRECTION

Patent No. 3,383,302                May 14, 1968

Roger W. Johnson

It is certified that error appears in the above identified patent and that said Letters Patent are hereby corrected as shown below:

Column 1, line 30, before "potential" insert -- a --.
Column 3, line 1, before "body" insert -- electrical stock removal tool includes a conductive --.

Signed and sealed this 30th day of September 1969.

(SEAL)
Attest:

Edward M. Fletcher, Jr.
Attesting Officer

WILLIAM E. SCHUYLER, JR.
Commissioner of Patents